(12) United States Patent
Kalabic et al.

(10) Patent No.: US 11,676,064 B2
(45) Date of Patent: Jun. 13, 2023

(54) CONSTRAINT ADAPTOR FOR REINFORCEMENT LEARNING CONTROL

(71) Applicant: Mitsubishi Electric Research Laboratories, Inc., Cambridge, MA (US)

(72) Inventors: Uros Kalabic, Boston, MA (US); Zhaojian Li, Ann Arbor, MI (US); Abraham Goldsmith, Boston, MA (US)

(73) Assignee: Mitsubishi Electric Research laboratories, Inc., Cambridge, MA (US)

( * ) Notice: Subject to any disclaimer, the term of this patent is extended or adjusted under 35 U.S.C. 154(b) by 830 days.

(21) Appl. No.: 16/542,299

(22) Filed: Aug. 16, 2019

(65) Prior Publication Data

US 2021/0049501 A1 Feb. 18, 2021

(51) Int. Cl.
*G05B 13/04* (2006.01)
*G06N 20/00* (2019.01)
*G05B 19/406* (2006.01)

(52) U.S. Cl.
CPC ............ *G06N 20/00* (2019.01); *G05B 13/04* (2013.01); *G05B 19/406* (2013.01)

(58) Field of Classification Search
CPC ...... G06N 20/00; G05B 13/04; G05B 19/406; G05B 13/0265; G05B 13/048
See application file for complete search history.

(56) References Cited

U.S. PATENT DOCUMENTS

| 2014/0277744 | A1 | 9/2014 | Coenen |
| 2018/0017971 | A1* | 1/2018 | Di Cairano ......... B60W 30/045 |
| 2019/0258938 | A1* | 8/2019 | Mnih ..................... G06N 3/084 |
| 2020/0017117 | A1* | 1/2020 | Milton ................... G07C 5/008 |

FOREIGN PATENT DOCUMENTS

EP 3319016 5/2018

OTHER PUBLICATIONS

Ratliff et al. (Nathan D. Ratliff, J. Andrew Bagnell, Marin A. Zinkevich, 2006, Proceedings of the 23rd International Conference on Machine Learning, Pittsburgh, PA., pp. 729-736) (Year: 2006).*
Felix Berkenkamp et al., "Safe Model based Reinforcement Learning with Stability Guarantees," May 23, 2017, https://papers.nips.cc/paper/6692-safe-model-based-reinforcement-learning-with-stability-fuarantees.pdf.

* cited by examiner

*Primary Examiner* — Michael W Choi
(74) *Attorney, Agent, or Firm* — Gennadiy Vinokur; Hironori Tsukamoto

(57) ABSTRACT

A system for controlling an operation of a machine subject to state constraints in continuous state space of the machine and subject to control input constraints in continuous control input space of the machine is provided. The apparatus includes an input interface to accept data indicative of a state of the machine, a memory configured to store an optimization problem for computing the safety margin of a state and action pair satisfying the state constraints and a control policy mapping the state of the machine within a control invariant set (CIS) to a control input satisfying the control input constraints, and a processor configured to iteratively perform a reinforcement learning (RL) algorithm to jointly control the machine and update the control policy.

14 Claims, 9 Drawing Sheets

CONSTRAINT ADAPTOR FOR REINFORCEMENT LEARNING CONTROL

TECHNICAL FIELD

The invention relates generally to system control, and more particularly to methods and apparatus for data-driven control of a constrained machine.

BACKGROUND

Control theory in control systems engineering is a subfield of engineering that deals with the control of continuously operating dynamical systems in engineered processes and machines. The objective is to develop a control policy for controlling such systems using a control action to prevent delay or overshoot and ensure control stability and robustness. A secondary objective is to do this in an optimal manner.

For example, optimization-based control and estimation techniques, such as model predictive control (MPC), allow a model-based design framework in which the system dynamics and constraints can directly be taken into account. MPC is used in many applications to control dynamical systems of various complexities. Examples of such systems include production lines, car engines, robots, numerically controlled machining, satellites and power generators. However, in a number of situations, a model of a controlled system is unavailable, difficult to update in real-time, or inaccurate. Examples of such cases are prevalent in robotics, building control (HVAC), vehicles, smart grids, factory automation, transportation, self-tuning machines, and traffic networks.

With presence of only partial or uncertain models of dynamical systems, some control methods exploit operational data generated by these systems in order to construct feedback control policies that stabilize the system dynamics, or embed quantifiable control-relevant performance. The use of data to design control policies is called data-driven control. There are two kinds of data-driven control methods: indirect methods that first construct a model of the system and then leverage the model to design controllers, or direct methods that directly construct control policies from data without the intermediate model-building step. A drawback of indirect methods is the potential requirement of large quantities of data in the model-building phase. Conversely, direct methods require less data. However, even cutting-edge direct control methods experience difficulties in handling state and input constraints that are imperative for maintaining safe operation in closed-loop control systems as constraint violations can often be catastrophic and destroy the system.

For example, reinforcement learning (RL) is an area of machine learning concerned with how to take actions in an environment so as to maximize some notion of cumulative reward (or equivalently, minimize a cumulative loss/cost). Reinforcement learning is closely related with optimal control in continuous state-input spaces, which is concerned mostly with the existence and characterization of optimal control policies, and algorithms for their computation in the absence of a mathematical model of the controlled system and/or environment.

However, current RL methods do not consider data-driven control of constrained systems. This is because the conventional RL methods do not consider state and input constraint satisfaction in continuous state-action spaces; that is, conventional RL does not guarantee that the states of the controlled system operating in the presence of control inputs satisfy state and input constraints throughout the operation. A problem of conventional RL is that during the exploration stage, the RL perturbs the system with different inputs to learn the states corresponding to the control inputs. Moreover, to better learn a system, it is beneficial to use control inputs approaching physical boundaries of possible constraints. Because there is no complete and accurate model of the controlled system or the controlled machine, there is no guarantee that arbitrarily selected control inputs and/or boundary-valued control inputs will not direct the system state to an area outside the specified state constraint set, thereby resulting in the violation of state constraints.

Accordingly, there is a need for a system and a method for control of a system with unmodeled dynamics subject to state and control input constraints for operational safety.

SUMMARY

It is an object of some embodiments to provide a system and a method for data-driven control of a machine subject to state and control input constraints. Additionally, or alternatively, it is an object of some embodiments to provide such a system and a method that extends some principles of reinforcement learning (RL) to guarantee or at least to improve satisfaction of the state and/or control input constraints in continuous state space of the controlled machine.

Additionally, or alternatively, it is an object of some embodiments to adapt legacy RL controllers designed for unconstrained control to control of a machine subject to constraints. In effect, it is an object of some embodiments to provide a constraint adaptor for RL control to transform an RL controller of an unconstrained machine to an RL controller of a constrained machine.

Some embodiments are based on an understanding of segmented structure of reinforcement learning. The reinforcement learning includes three distinct parts repeated over multiple iterations. The first part is the control of a machine using a control policy that transitions the state of a machine from a current state to the next state. The next part is an execution of a reward function that estimates a reward for a quality of the current control policy. The third part is an update of the control policy using the reward determined by the reward function.

Some embodiments are based on recognition that the essence of reinforcement learning lies in the update of the control policy. Such an update can be machine dependent and may require time and expertise to design. In addition, despite the fact that the update of the control policy is based on the reward determined by the reward function, the update is independent from the reward function itself, meaning that the same update procedure of the reinforcement learning can work with various types of reward functions without modifications.

Accordingly, some embodiments are based on understanding that in order to adapt legacy RL controllers designed for unconstrained control to control of a machine subject to constraints, the adaptation can be performed at the reward function while preserving the integrity of control policy update. This is advantageous, because it does not require the redesign of the RL controller to explicitly consider constraints. This avoids the difficult work of creating a new RL algorithm.

To that end, it is an object of some embodiments to design an adaptation term that can be used in various reward functions to consider the danger of violating constraints during constrained RL control. Moreover, it is an object of some embodiments to design such an adaptation term that considers gradual increase or decrease of such a danger, as contrasted with binary term that indicates presence or absence of constraint violation. Such a gradual adaptation term is advantageous, because it informs the RL controller of the potential for constraint violation, giving it enough time to modify its behavior before constraint violation occurs. To the best of our knowledge, such a gradual adaptation does not yet exist.

Some embodiments are based on recognition that a control problem for controlling an operation of a machine subject to state constraints in continuous state space of the machine and subject to control input constraints in continuous control input space of the machine can be formulated as a control problem of a machine having a state within a control invariant set (CIS) of the states of the machine satisfying the state constraints. The CIS is coupled to, or associated with, a corresponding control policy that guarantees that when a machine is in the CIS and is controlled according to this control policy, the state of the machine is maintained with the CIS and, therefore, such a control always satisfies the constraints. Some embodiments are based on the recognition that a location of the current state of the controlled machine with respect to the CIS can server as a gradual adaptation term for indicating a danger of violating the constraints.

Specifically, some embodiments augment a reward function with an adaptation term determined as the minimum amount of effort needed to stay in the CIS. Some embodiments are based on recognition that such an adaptation term is advantageous because regions where smaller amounts of effort are required to stay within the CIS correspond to regions where there is less chance of constraint violation in case where RL exploration goes wrong. This is because the minimum control effort needed is, by definition, no more than the control effort needed to recover the system from the constraint boundary while optimizing the reward function, i.e., the former is a lower bound for the latter.

Hence, in various embodiments, the adaptation term is a bounded function having a zero value at a zero-effort subset of the CIS requiring zero-effort to maintain the state within the CIS, continuously varying values outside of the zero-effort subset but within the CIS determined as a function of a distance to a border of the zero-effort set, and having a predetermined large value outside of the CIS to indicate the catastrophic consequence of violating the constraints.

In effect, such an adaptation term augments a legacy reward function of a legacy RL controller to adapt the legacy controller for constrained control. Additionally, or alternatively, the adaptation term can modify the new reward function specifically designed for controlling a machine. The result of this modification is that from the very first control action, the controller learns the path of maximum reward is the shortest path that brings the state into towards the zero-effort subset. Once the state has entered the zero-effort subset the distance penalty part of the reward function is at its minimum (typically set at 0) and the controller is rewarded only for actions that drive the actual state as close as possible to the desired state. The control invariant set is the set of all states for which there exists a sequence of controls that will lead to constraint enforcement. By definition, when the state is outside of the control invariant set, there is no solution that will avoid constraint violation. In these situations, the distance defined above is undefined. Various embodiments set it to a very large number to heavily penalize this situation and prevent it from occurring again.

Some embodiments are based on recognition that controllers with safety guarantees are usually determined based on a model of the machine, which for a number of practical systems is uncertain. However, an adaptation term determined as the minimum amount of effort needed to stay in the CIS is still an effective constraint adaptor for RL controllers. Because the control policy is updated using operational data and asymptotically converges to an optimal control policy for control of a constrained machine in consideration of the augmented reward function, these embodiments account for uncertainty of the model.

Accordingly, one embodiment discloses an apparatus for controlling an operation of a machine subject to state constraints in continuous state space of the machine and subject to control input constraints in continuous control input space of the machine includes an input interface to accept data indicative of a state of the machine; a memory configured to store an optimization problem for computing the safety margin of a state and action pair satisfying the state constraints and a control policy mapping a state of the machine within the control invariant set (CIS) to a control input satisfying the control input constraints, wherein a control of the system having the state within the CIS according to the control policy maintains the state of the system within the CIS; and a processor configured to iteratively perform a reinforcement learning (RL) to jointly control the machine and update the control policy, wherein, for performing the joint control and update. In this case, the processor is configured to control the machine using the control policy to collect data including a sequence of control inputs generated using the control policy and a sequence of states of the machine corresponding to the sequence of control inputs; determine a reward for a quality of the control policy on the state of the machine using a reward function of the sequence of control inputs and the sequence of states of the machine augmented with an adaptation term determined as the minimum amount of effort needed for the machine having the state to remain within the CIS; and update the control policy that improves a cost function of operation of the machine according to the determined reward.

Further, some embodiments of the present invention can provide a computer-implemented method for controlling an operation of a machine subject to state constraints in continuous state space of the machine and subject to control input constraints in continuous control input space of the machine. In this case, the method includes steps of accepting data indicative of a state of the machine; computing a safety margin of a state and action pair satisfying the state constraints and a control policy mapping the state of the machine within a control invariant set (CIS) to a control input satisfying the control input constraints, wherein a control of the machine having the state within the CIS according to the control policy maintains the state of the machine within the CIS; and iteratively performing a reinforcement learning (RL) algorithm to jointly control the machine and update the control policy, wherein, for performing the joint control and update, wherein the iteratively performing step comprises: controlling the machine using the control policy to collect data including a sequence of control inputs generated using the control policy and a sequence of states of the machine corresponding to the sequence of control inputs; determining a reward for a quality of the control policy on the state of the machine using a reward function of the sequence of control inputs and the sequence of states of the machine augmented with an adaptation term determined as the minimum amount of effort needed for the machine having the state to remain within the CIS; and updating the control policy that improves a cost function of operation of the machine according to the determined reward.

BRIEF DESCRIPTION OF THE DRAWINGS

The presently disclosed embodiments will be further explained with reference to the attached drawings. The drawings shown are not necessarily to scale, with emphasis instead generally being placed upon illustrating the principles of the presently disclosed embodiments.

DETAILED DESCRIPTION

Figure 1A:
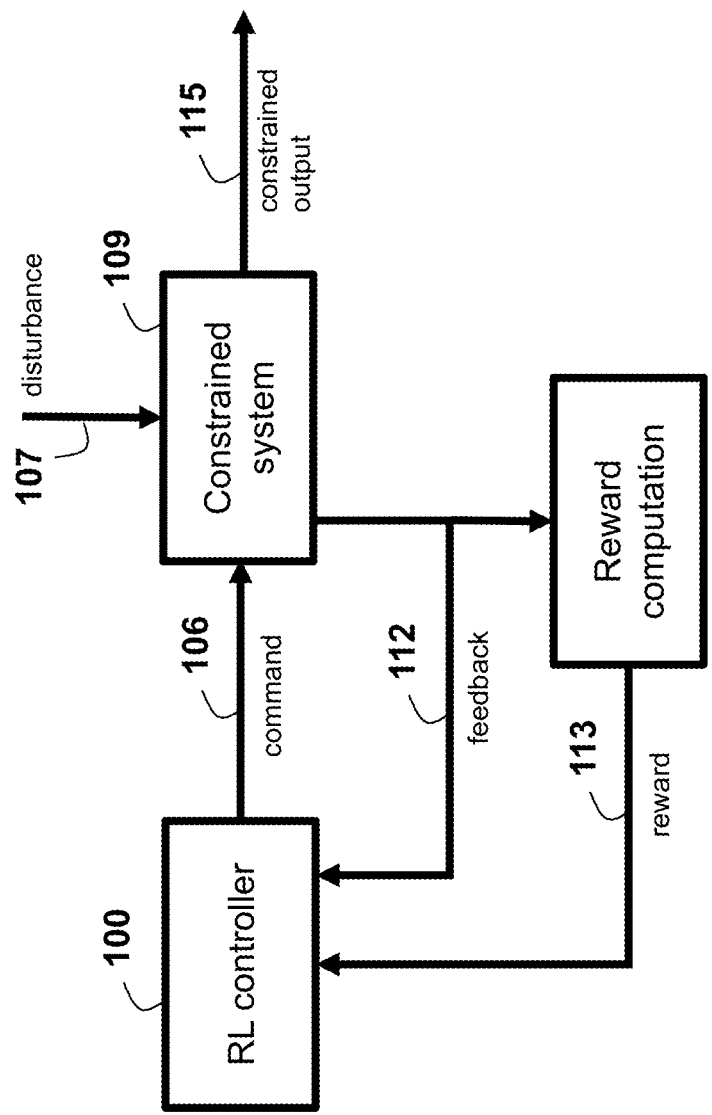
FIG. 1A presents a conventional scheme for controlling a system by a conventional reinforcement learning controller.

Various embodiments of the present invention are described hereafter with reference to the figures. It would be noted that the figures are not drawn to scale elements of similar structures or functions are represented by like reference numerals throughout the figures. It should be also noted that the figures are only intended to facilitate the description of specific embodiments of the invention. They are not intended as an exhaustive description of the invention or as a limitation on the scope of the invention. In addition, an aspect described in conjunction with a particular embodiment of the invention is not necessarily limited to that embodiment and can be practiced in any other embodiments of the invention.

It is an object of some embodiments to provide a system and a method for controlling an operation of a machine using a data-driven state feedback optimal controller. It is another object of some embodiments to provide such a controller that is suitable for controlling a machine subject to safety constraints. An example of such a data-driven optimal controller uses reinforcement learning (RL) to determine control policies based on data obtained during the operation of the controlled machine and a supervisor to provide feedback to the RL-based controller on safe operation of the control.

FIG. 1A shows an example of an ordinary RL controller 100 in feedback with a system 109. The controller passes a command 106 to the system and the system performs actions according to the command. When the system is linear, it can be modeled according to a difference equation:

$$x(t+1) = Ax(t) + Bu(t) + B_w w(t) \qquad (1)$$

where x is a vector containing the system states, u is a vector of commands, and w is a vector of disturbances. When the system is nonlinear, it can in the majority of practical purposes be modeled as a linear system. The RL controller receives a feedback signal 112 from the system which is generally a function of both the system state and command vectors and not a function of the disturbance input vector because that is generally unknown. The controller modifies the command according to the feedback. In general, the feedback q (t) is a function of all the vectors above:

$$q(t) = f(x(t), u(t), w(t)) \qquad (2)$$

The system 109 is output-constrained, meaning that the output 115 is subject to constraints. The output can be described mathematically as a linear combination of the system state vector, command vector, and disturbance input vector:

$$y(t) = Cx(t) + Du(t) + D_w w(t) \qquad (3)$$

Figure 1B:
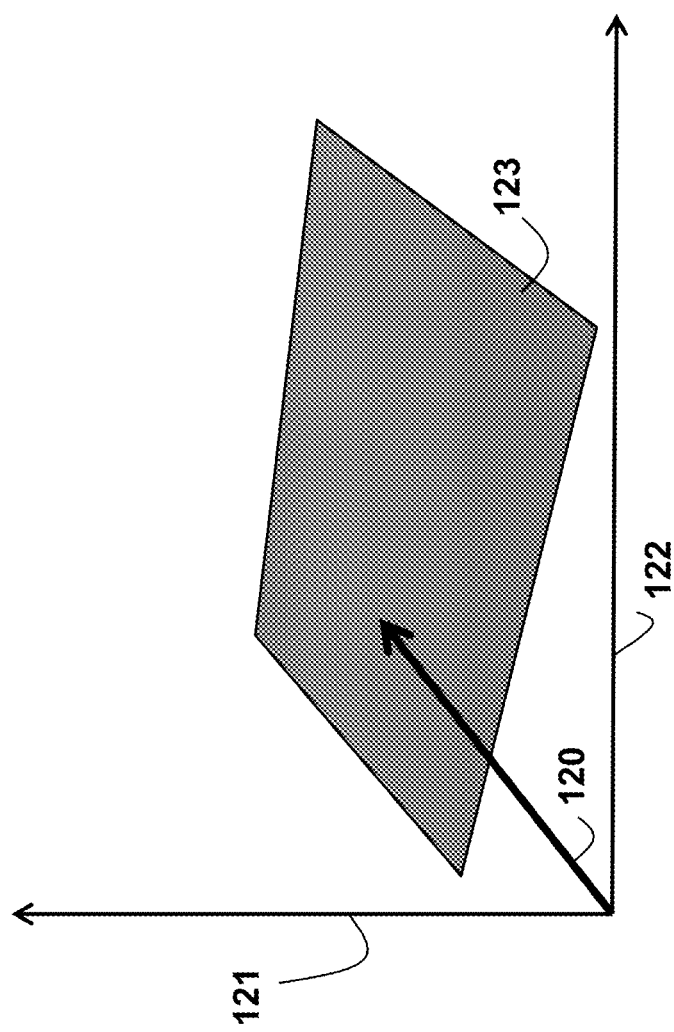
FIG. 1B is a schematic diagram presenting a constraint set.

The output is a vector and the constraints that it is subject to are modeled as a set. FIG. 1B shows a two-dimensional output vector 120 and a constraint set 123 plotted against a set of axes. The axes together form a basis for the vector space which describe the output. Let $\hat{e}_1$ be a vector parallel to axis 121 and $\hat{e}_2$ be a vector parallel to axis 122. Then the output y(t) can be expressed as $$Y(t) = y_1(t)\hat{e}_1 + y_2(t)\hat{e}_2$$

where $y_1(t)$ and $y_2(t)$ are appropriately valued scalars. For safe operation, the output must remain in the constraint set 123. Mathematically, the constraints are represented as linear-inequality requirements:

$$Sy(t) \leq s \qquad (4)$$

which represent the polytope or polygon that geometrically represents the constraints.

Algorithms used in RL generally do not protect against constraint violation. Conventional RL algorithms work through a trial-and-error process that aims to maximize an accumulation of discounted rewards:

$$\Sigma_{t=0}^{\infty} \gamma^t r(t), \qquad (5)$$

where r(t) is the reward function and $\gamma < 1$ is a positive discount factor. FIG. 1A shows the reward 113 as an output of a function that obtains the feedback 112 and computes the reward. The trial-and-error process works to determine a policy $\pi_\theta$ which is a function that maps the feedback 112 to the command 106 and is parametrized by some parameter vector θ. The policy is the function that maps the feedback to the command:

$$u(t) = \pi_\theta(q(t)) \qquad (6)$$

Figure 1C:
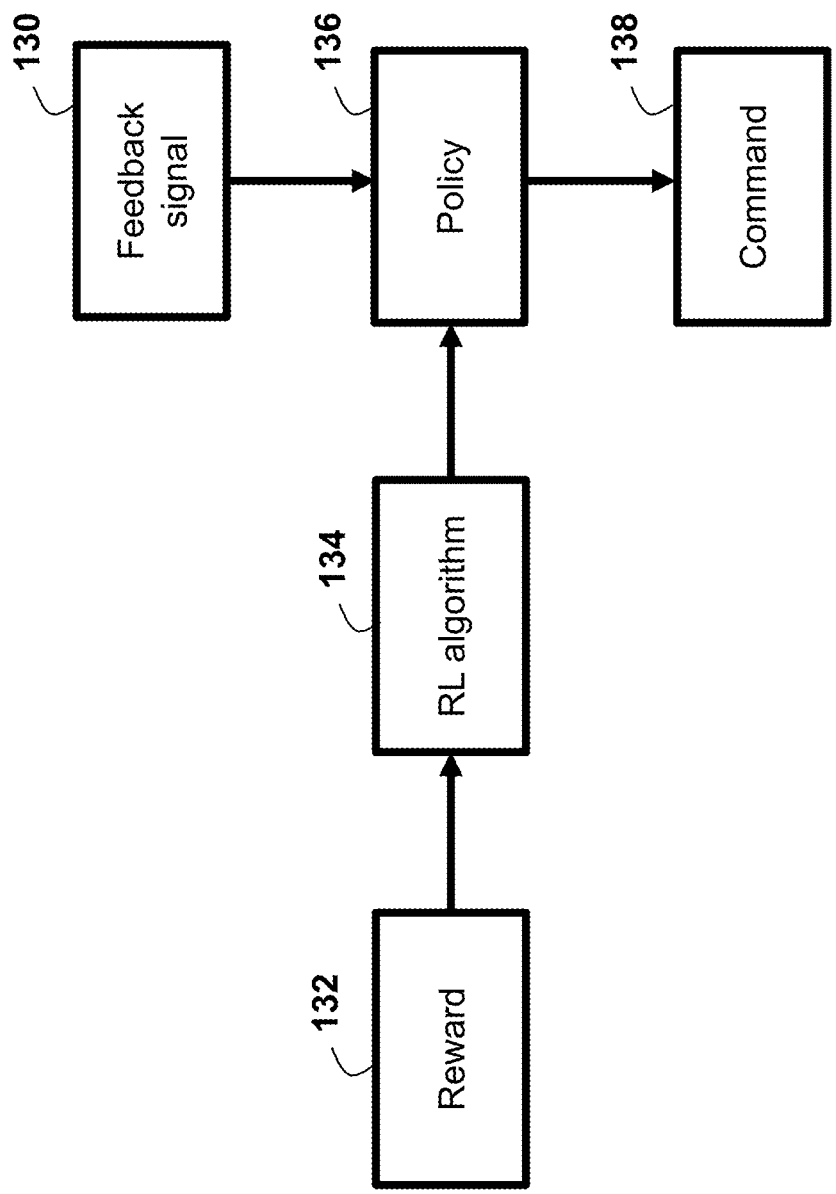
FIG. 1C is a flowchart of a conventional reinforcement learning algorithm.

FIG. 1C shows the general working of the RL controller according to the present invention. During each sample time t of the system, the reward 132 is sent to the RL algorithm 134, which determines the parameter vector θ to parameterize the policy 136, $\pi_\theta$. The feedback signal 130 is transformed by the policy 136 to the control command 138.

The main idea behind this invention is to modify the reward function r(t) to be the reward function minus a cost function c(t) that measures the danger of constraint violation. The updated reward is therefore:

$$\tilde{r}(t)=r(t)-c(t) \quad (7)$$

The cost function c(t) is determined by an add-on element called a supervisor.

Figure 2A:
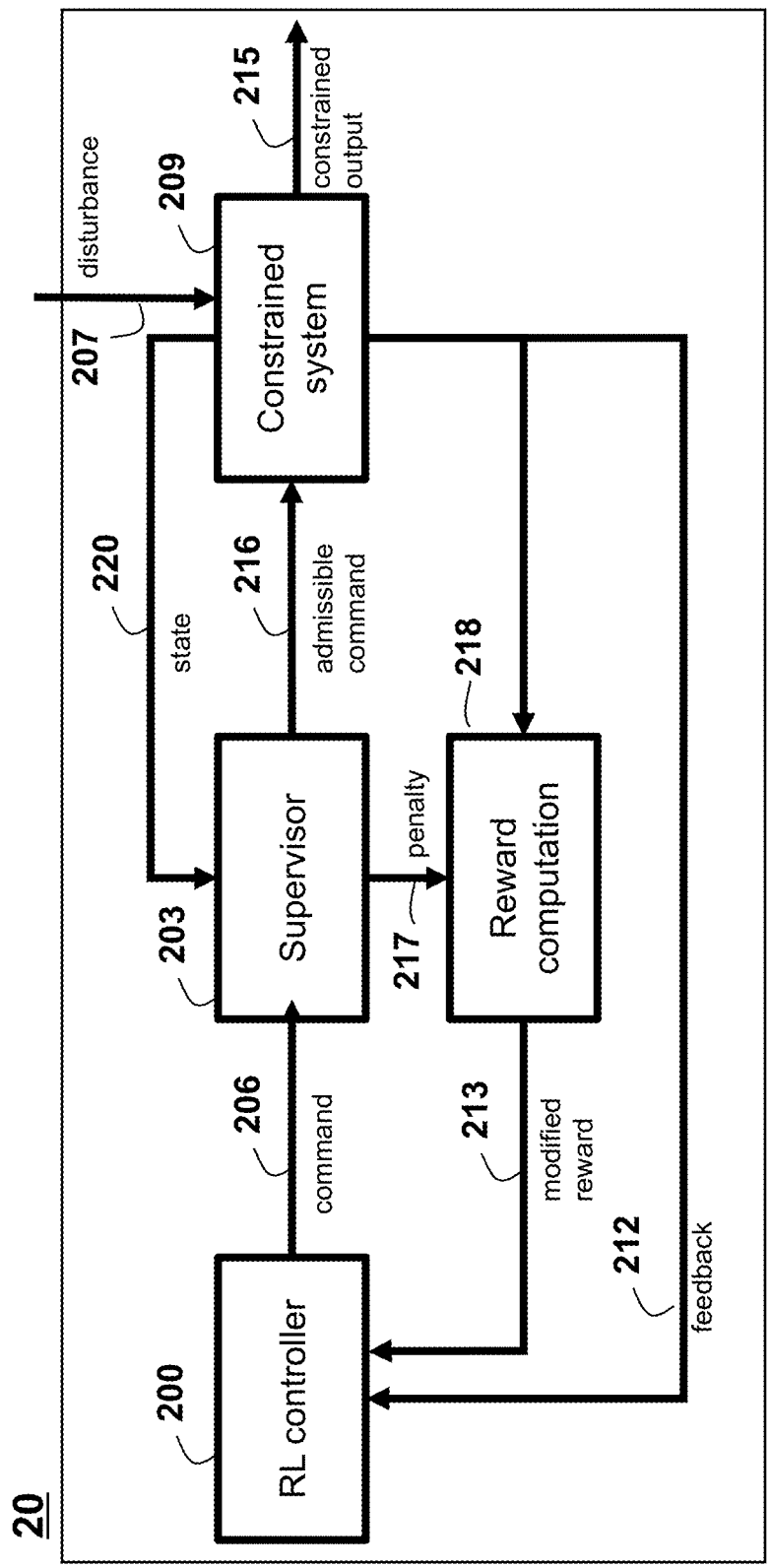
FIG. 2A is a diagram indicating a safe supervisor scheme for controlling a system by a reinforcement learning controller, according to embodiments of the present invention.

FIG. 2A is a diagram indicating a safe supervisor scheme (method) used in a control system 20 for controlling a system by a reinforcement learning controller, according to embodiments of the present invention.

FIG. 2A shows a control system 20 that includes the supervisor 203 placed between the RL controller 200 and the constrained system 209. The supervisor 203 obtains the state measurement or estimate 220 from the system 209 and computes a desired safety margin that gets converted to a penalty 217 and sent to the reward computation 218 for obtaining the modified reward 213. At the same time, the supervisor transmits a safe command 216 in case the command 206 was deemed unsafe. The safe command is a modification of the unsafe command determined according to the optimization (SO):

$$c(t)=\min \alpha \sum_{k=1}^{N} \|u(k|t)\|_1 \quad (8)$$

subject to the constraint:

$$Sy(k|t)+y_w^\beta(k, S) \leq s \quad (9)$$

for k=0, ..., N−1 and subject to the constraint:

$$Hy(k|t)+y_w^\beta(k, H) \leq h \quad (10)$$

The term y(k|t) is the predicted value of y(t+k) at time t according to the dynamics:

$$x(k+1|t)=Ax(k|t)+Bu(k|t) \quad (11)$$

$$y(k|t)=Cx(k|t)+Du(k|t) \quad (12)$$

With the initial conditions x(0|t)=x(t), which is obtained from the system, and u(0|t)=u(t), which is obtained from the RL controller. The term $y_w^\beta(k, S)$ is the support of the disturbance set with probability β. This set is the set $\Xi_k$ satisfying:

$$Pr(y_w(t+k)-y(k|t) \in \Xi_k)=\beta \quad (13)$$

so that $y_w^\beta(k, S)$ is the solution to:

$$\min S^T y_w \quad (14)$$

subject to the constraint:

$$y_w \in \Xi_k \quad (15)$$

The multiplicative factor α in the (SO) problem is a scaling factor that modifies the size of the cost c(t). In the above, k, N are integers, and t is a current time of the system.

The solution to the (SO) problem is the minimum effort required to keep the system within constraints according to the system model. The system model is not perfect and hence the need for RL to obtain a more optimal control. Furthermore, RL cannot handle constraints and hence the need for a supervisor (or supervisor algorithm) to inform RL of constraint violation. In this way, the functions of the RL algorithm and the supervisor are complimentary to each other. The supervisor is model-based and can determine the optimal value according to the linear model through a relatively simple computation. For example, in the case of the supervisor, we can obtain a strong bound on the value of N, which is the maximum number of steps needed to return to the zero-effort set. To obtain N, we compute the control invariant set (CIS), which is the set of all system states x(t) for which there exists a command u(t) that would return the state into the CIS according to the system dynamics and satisfy the set-membership constraint Sy(t)≤s. Therefore, if a state is not in the CIS, the system is guaranteed to eventually violate constraints.

One way to compute the CIS is to compute the set of all combinations of initial states and commands that guarantee constraint enforcement and project this onto the x-axis. Once the projection is no longer growing the resulting set, we have found the limit N. Specifically, we compute the CIS by defining the set:

$$C_0=\{(x, u_0):S(Cx+Du_0) \leq s\} \quad (16)$$

and then recursively computing the sets:

$$C_k=\{(x, u_0, \ldots, u_k):Ax+Bu_i \in C_{k-1}, i=1, \ldots, k, (x, u_0) \in C_0\} \quad (17)$$

The CIS is the projection of $\lim_{k \to \infty} C_k$ onto the x-axis. When the projection at step k is the same size as the projection at step k−1 we set N=k−1. For practical purposes, we can stop the algorithm a little earlier when the difference in projections is deemed negligible.

The existence of the CIS set implies that there sometimes does not exist a solution to the (SO) problem, as the state may not be inside the CIS. Furthermore, if the state is outside of the CIS then, according to the model, the system will inevitably violate constraints as there does not exist a solution to the (SO) problem. If this occurs, we set the penalty to c(t)=−G, where G is a very large number that is larger than any other possible penalty and performs a procedure to determine a modified command.

The zero-effort set itself is the set of states for which the solution to the (SO) problem is nil. This set can be characterized a set of linear inequalities $$Hy(k|t)+y_w^\beta(k, H) \leq h \quad (18)$$

for k=0, ..., N*. So far, it is unknown how to compute N*, but it is know that the value is finite and that it is related to the rate of decay of the linear system. Therefore we choose an N* which is much larger than the settling time of the linear system.

Figure 2B:
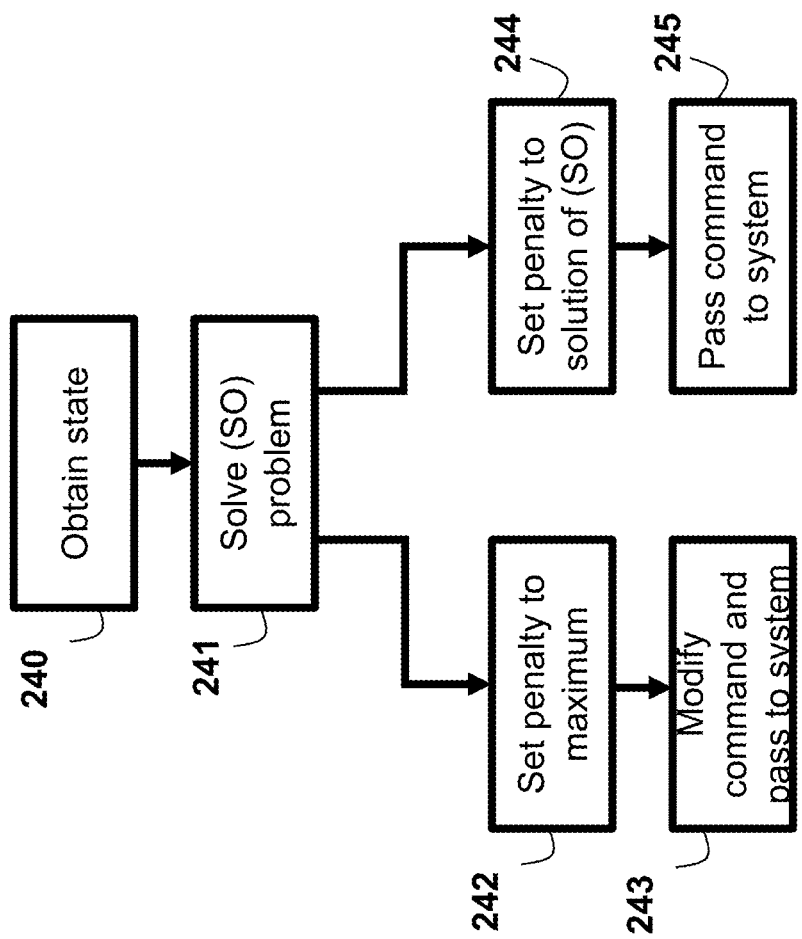
FIG. 2B is a flowchart indicating a safety supervisor algorithm, according to embodiments of the present invention.

FIG. 2B is a flowchart indicating a safety supervisor algorithm, according to embodiments of the present invention. FIG. 2B describes the procedure that determines the function of the safety supervisor algorithm of a control apparatus. The supervisor obtains the state 240 and attempts to solve the (SO) problem 241. If a solution exists, the supervisor sets the penalty c(t) to the solution of the problem 244 and passes the command received from the RL controller to the system 245. If a solution does not exist, it means that constraints will very likely be violated; therefore the supervisor sets the penalty c(t) to the maximum penalty 242 and modifies the command received from the RL controller and passes the modified command to the system 243.

After some experimentation, we realized that the safe command should be chosen at random. When a command is deemed unsafe, it means that applying it will lead to constraint violation. If we apply a slightly modified command, it does not greatly diminish the risk of violating constraints. Furthermore, staying within the neighborhood of an unsafe region leads the RL controller to not explore all possible regions. Therefore, we instead take drastic action and randomly sample a command satisfying constraints. We do this using a hit-and-run technique. We generate a sequence of commands $$\{u(0|t), u(1|t), \ldots, u(N-1|t)\}=\{u_0(0|t), u_0(1|t), \ldots, u_0(N-1|t)\} \quad (19)$$

that satisfy the following constraints:

$$Sy(k|t)+y_w{}^\beta(k, S) \le s \quad (20)$$

$$Hy(N+k'|t)+y_w{}^\beta(N+k', H) \le h \quad (21)$$

we then pick a random sequence $\{p_0, p_1, \ldots, p_{N-1}\}$ and set $$\{u(0|t), u(1|t), \ldots, u(N-1|t)\} = \{u_1(0|t), u_1(1|t), \ldots, u_1(N-1|t)\} \quad (22)$$

where $$u_1(k|t) = u_0(k|t) + \lambda p_k \quad (23)$$

for all $k=0, \ldots, N-1$, $k'=0, \ldots, N^*$ and some scalar $\lambda$. We then find the smallest $\lambda$ that satisfies the above constraints. We repeat the above to find sequences of $u_2, u_3, \ldots$ Since we are guaranteed that as $k \to \infty$ for $u_k$, then the sequence of $u_k$ will be truly random and we will have sampled the constraints uniformly randomly.

According to some embodiments of this invention, a control system or a control apparatus for controlling an operation of a machine subject to state constraints in continuous state space of the machine and subject to control input constraints in continuous control input space of the machine is realized. To that end, the system or the apparatus may include an input interface to accept data indicative of a state of the machine; a memory configured to store an optimization problem for computing the safety margin of a state and action pair satisfying the state constraints and a control policy mapping a state of the machine within the control invariant set (CIS) to a control input satisfying the control input constraints, wherein a control of the system having the state within the CIS according to the control policy maintains the state of the system within the CIS; and a processor configured to iteratively perform reinforcement learning (RL) to jointly control the machine and update the control policy, wherein, for performing the joint control and update. In this case, the processor is configured to control the machine using the control policy to collect data including a sequence of control inputs generated using the control policy and a sequence of states of the machine corresponding to the sequence of control inputs; determine a reward for a quality of the control policy on the state of the machine using a reward function of the sequence of control inputs and the sequence of states of the machine augmented with an adaptation term determined as the minimum amount of effort needed for the machine having the state to remain within the CIS; and update the control policy that improves a cost function of operation of the machine according to the determined reward.

The control method (safe supervisor algorithm) used in the control system or the apparatus according to the present invention can be applied to the machines used in a factory automation system, actuators and suspensions used in a robotic system or vehicles, or a plant system.

Figure 3:
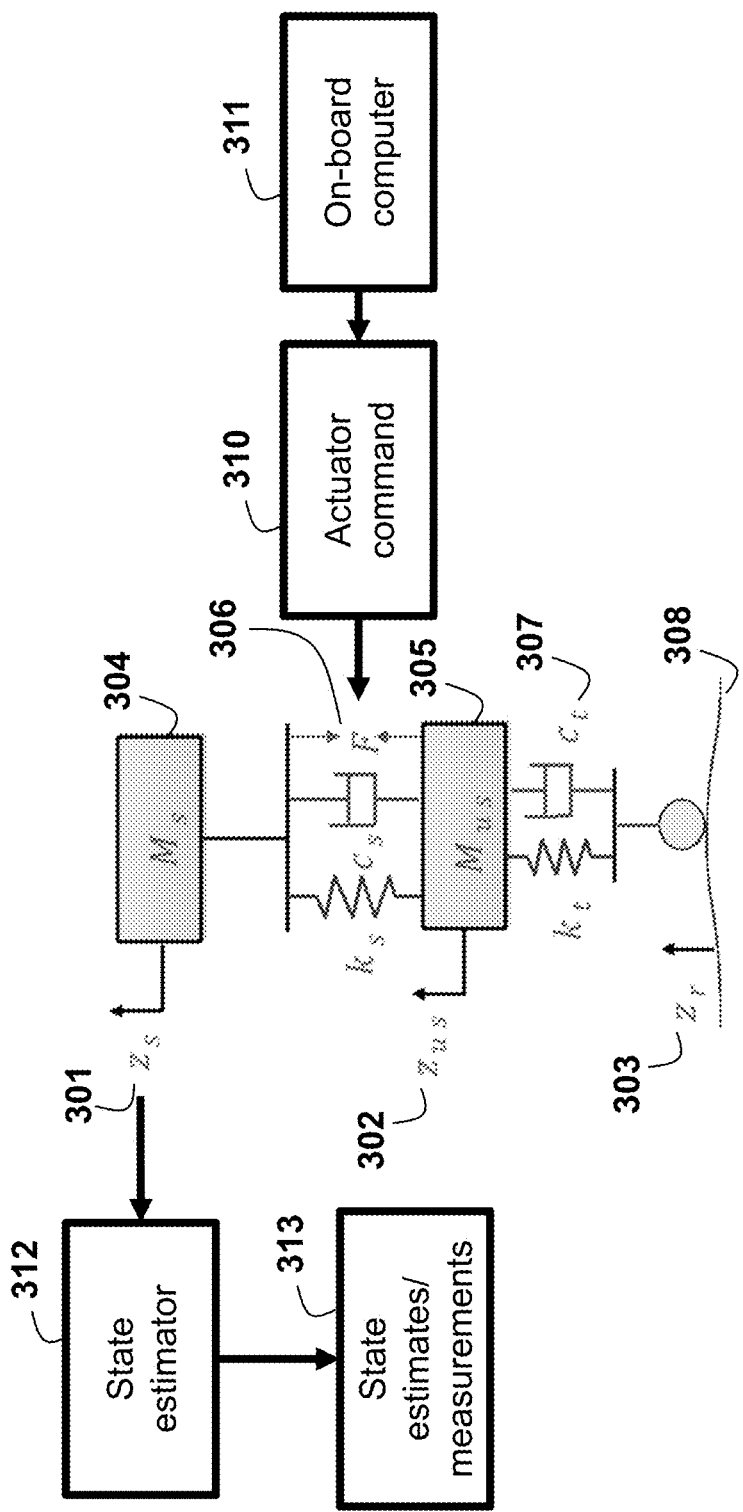
FIG. 3 is a schematic of a quarter-car model based on a safety supervisor algorithm, according to embodiments of the present invention.

FIG. 3 is a schematic of a quarter-car model based on a safety supervisor algorithm, according to embodiments of the present invention. Suspension systems can be modeled according to the quarter-car model which is a simplified model of the complex suspension system dynamics. For example, the simplified model assumes that the suspension springs are linear, which is not truly the case, especially when the spring is greatly stretched; in this case, the spring force is better modeled by, for example, a cubic relationship to the spring displacement.

Although a vehicle suspension system is described below as an example, the safe supervisor (safe supervisor control method) according to the present invention is not limited to the vehicle suspension, the safe supervisor can be applied to control actuators and suspensions used in a robotic system or a factory automation system.

FIG. 3 provides a schematic of the quarter-car, with the sprung mass 304 modeling a quarter of the vehicle-body mass resting on the suspension, the unsprung mass 305 modeling the vehicle wheel. The displacement of the sprung mass height from equilibrium 301 is denoted by $z_s$ and the displacement of the unsprung mass height from equilibrium 302 is denoted by $z_{us}$. The sprung and unsprung mass are connected by an active suspension system 306 which is modeled as a spring-damper assembly with an actuation force F from an actuator. The actuator is commanded by the controller, which runs on an on-board computer 311. The algorithm on this computer determines and actuator command 310, which is the force F. The contact between the road 308 and the wheel is modeled as a spring-damper system. The height of the road 303 is denoted by $z_r$. Since the system is modeled as an interconnection of masses, springs, and dampers, its dynamics are given by a two degree-of-freedom set of dynamical equations:

$$M_s(\ddot{z}_s - \ddot{z}_{us}) + c_s(\dot{z}_s - \dot{z}_{us}) + k_s(z_s - z_{us}) = F \quad (24)$$

$$M_{us}\ddot{z}_{us} + c_t\dot{z}_{us} + k_t(z_{us} - z_r) - c_s(\dot{z}_s - \dot{z}_{us}) - k_s(z_s - z_{us}) = F + M_{us}\ddot{z}_r + c_t\dot{z}_r \quad (25)$$

Because they are linear, these equations can be transformed into the required format by letting:

$$x(t) = z_s(t) - z_{us}(t), \dot{z}_s(t), z_{us}(t) - z_r(t), \dot{z}_{us}(t)) \quad (26)$$

$$v(t) = F(t) \quad (27)$$

$$w(t) = M_{us}\ddot{z}_r(t) + c_t\dot{z}_r(t) \quad (28)$$

We then let:

$$v(t) = -Kx(t) + u(t) \quad (29)$$

where K is a stabilizing feedback, i.e., the matrix A−BK is a stable matrix and hence the dynamics of x(t) are stable. The matrix K represents a stabilizing feedback controller which has been designed to control the active suspension. Our intention is to use the RL algorithm to improve the controller in the presence of constraints. In this explanation, the feedback state x(t) is assumed to be directly measured using some instrumentation. This is because in our experimentation, we were able to measure all the states. However, it is likely that in real-world application, one would implement a state estimator 314 to obtain the state estimates 315 by measuring the vertical displacement of the sprung mass 301 using displacement sensors, such as linear variable displacement transducers. The nominal feedback controller has not been designed with constraints in mind and therefore the RL algorithm should improve the controller performance especially in the presence of constraints.

The constraints we consider are that 1) $z_s - z_{us} \ge \ell_{s,-}$ to protect the spring from breaking due to compression; 2) $z_s - z_{us} \le \ell_{s,+}$ to protect the spring from breaking due to stretching; 3) $|\dot{z}_s| \le f_s$ to ensure ride comfort for the passengers of the vehicle; and 4) $z_s - z_{us} \ge \ell_{us,-}$ to protect the wheel from being damaged due to compression of the tire; the terms $\ell_{s,-}$, $\ell_{s,+}$, $f_s$ and $\ell_{us,-}$ are positive scalar limits on the functions of the variables above. Since these constraints are linear, they can be modeled in the required form.

The RL algorithm we apply is the deep-deterministic policy gradient (DDPG) algorithm due to its ability to deal with continuous control systems. DDPG learns both a critic network to estimate the long-term value for a given policy and an actor network to sample the optimal action. In application to the suspension system, the critic network is composed of two hidden fully-connected layers, with 160 and 120 neurons respectively, and the actor network is composed of two hidden fully-connected layers, with 160 and 120 neurons respectively, and a softmax layer to sample the optimal action. For the rest of the design of the DDPG algorithm, default hyperparameters have been used. Importantly, since it makes for better learning, DDPG does not apply the optimal control that it has learned:

$$u(t) = \pi_\theta(q(t)) \quad (30)$$

Instead, it applies the optimal control modified with some colored noise signal:

$$u(t) = \pi_\theta(q(t)) + \in_{OU} \quad (31)$$

where $\in_{OU}$ is the output of a colored noise (also called Ohrstein-Uhlenbeck) process.

Figure 4:
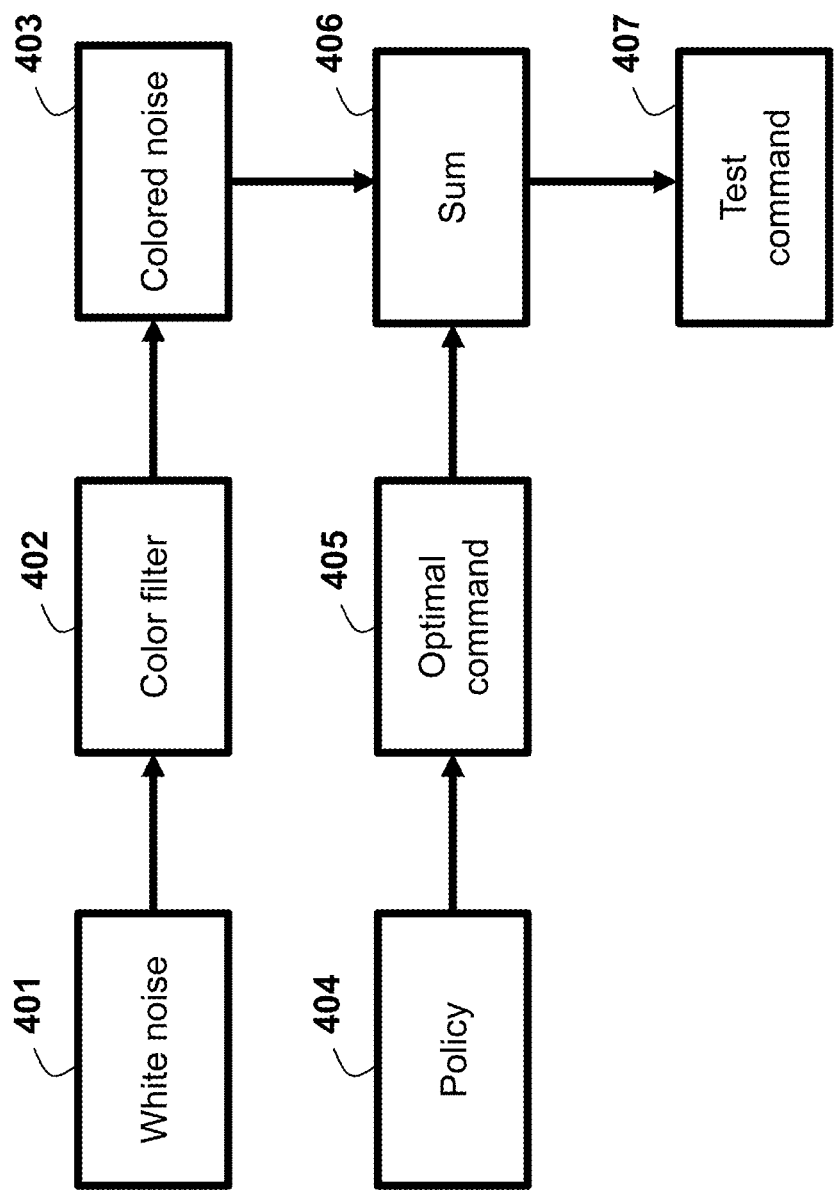
FIG. 4 shows the addition of noise to the output of a deep-deterministic policy gradient algorithm, according to embodiments of the present invention.

FIG. 4 shows a schematic of this procedure. Colored noise 403 is the output of a color filter 402 with white noise 401 as an input. The output of the policy 404 is the optimal command 405. This command is summed with the noise 406 and the output is a test command 407. The test command 407 is not the actual actuator command. Before a command can be passed to the actuator, it needs to be checked by the supervisor 203 and modified to adhere to safety constraints if it is determined to violate safety constraints.

Figure 5:
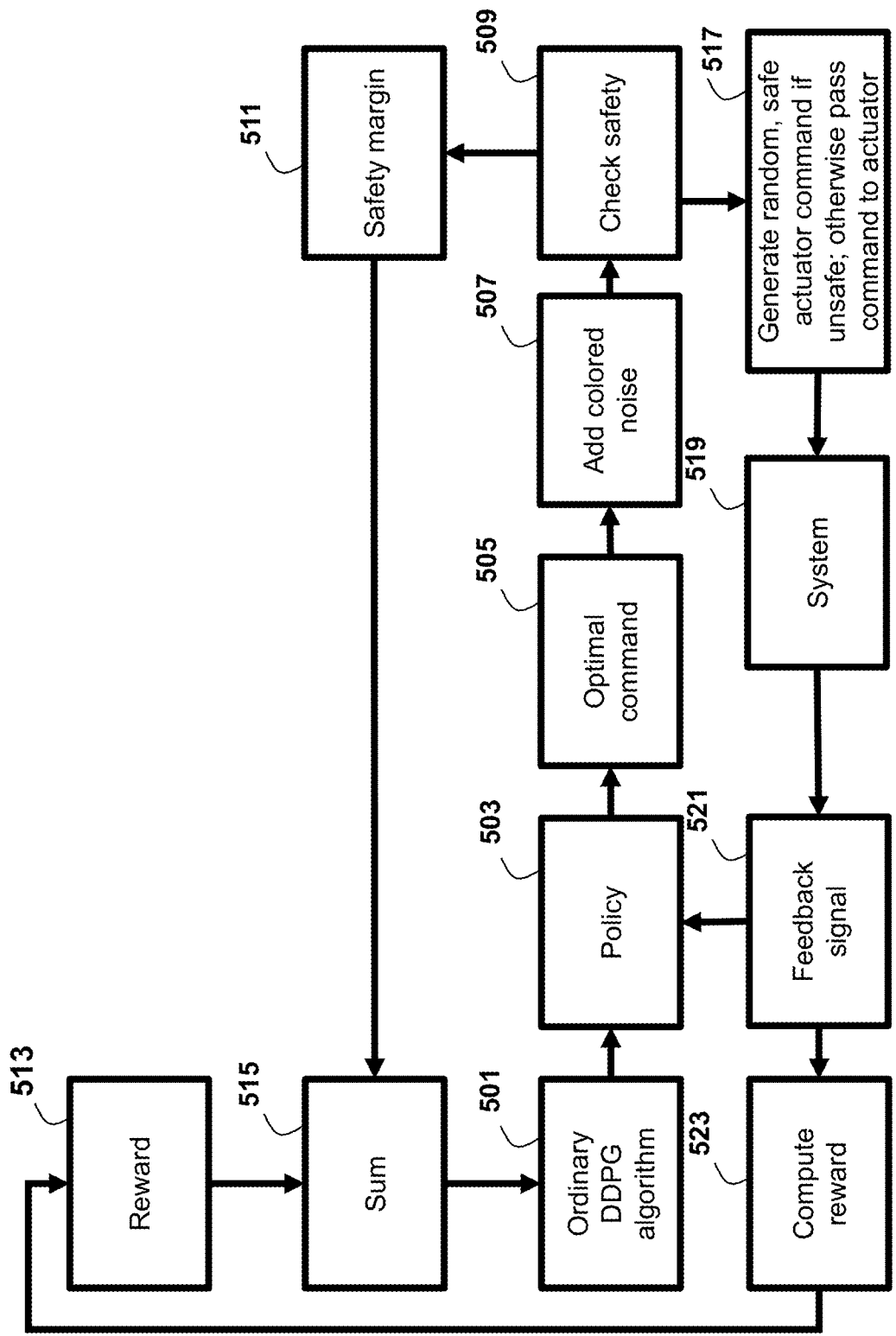
FIG. 5 shows a diagram indicating the entire operation of the scheme for safe reinforcement learning, according to embodiments of the present invention.

FIG. 5 shows the steps of the full safe RL method used in the control system or the control apparatus. The algorithm modifies the ordinary DDPG algorithm 501 to improve safety of the system. The optimal command 505 is generated by the policy 503. The algorithm adds colored noise 507 to the optimal command to determine the test command and checks safety 509 by solving the (SO) problem. As a result of solving the (SO) problem, a safety margin 511 is obtained, which is set to the maximum penalty if a solution does not exist. If a solution does exist, it means that the test command is safe and it is passed as the actuator command 517; if a solution does not exist, it means that the test command is unsafe, so the algorithm generates a random, safe actuator command. The safe actuator command is passed to the system 519 which returns a feedback signal 521 via measurement devices. The feedback signal is sent to the reward computation 523 which generates the reward 513. The safety margin is added to the reward 515 and the modified reward is passed to the DDPG algorithm.

It remains to explain the implementation details specific to suspension systems. The reward function that we wish to maximize is rider comfort:

$$r(t) = -|\ddot{z}_s(t)| \quad (32)$$

In other words, we wish that the motion of the sprung mass comfort be minimized. As stated above, the rider comfort is constrained between $\pm f_s$. This means that the reward is also constrained between these bounds. Through computation of the CIS, and experimentation of application of the safe RL algorithm, we have found that a good choice of the scaling factor $\alpha$ in the (SO) problem is one which ensures that the cost c(t) is always between $\pm c_b$ where $c_b$ are bounds on the cost function which, through experimentation, we set as:

$$c_b = 100 f_s \quad (33)$$

This is because the effort needed to return to safety is very large at the boundaries of the CIS, and so the scaling factor needs to be large to ensure that the cost is high enough nearer to the zero-effort set. Through experimentation, we also found that the maximum penalty G should always be about twice the value of $c_b$, that is:

$$G \approx 2c_b \quad (34)$$

If the maximum penalty is too large, it induces a dominant effect on the learning process of the RL algorithm and the algorithm generates commands that overly avoid constraints. Therefore choosing G to be on the order of magnitude of the largest possible solution the (SO) problem is appropriate.

Figure 6:
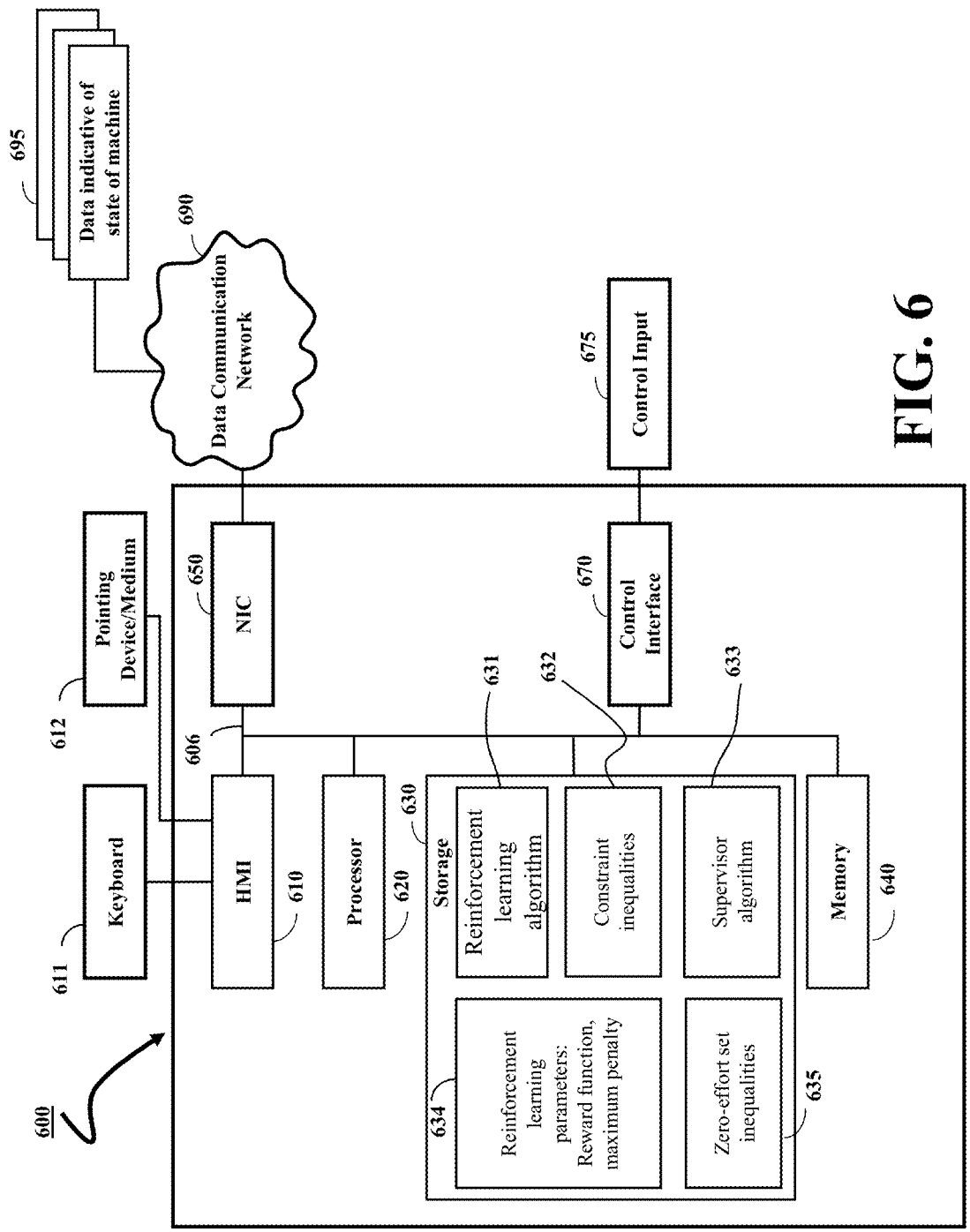
FIG. 6 is a diagram illustrating an example of a control apparatus for controlling an operation of a machine subject to state constraints in continuous state space of the machine and subject to control input constraints in continuous control input space of the machine, according to embodiments of the present invention.

FIG. 6 shows a block diagram of a control system (apparatus) 600 controlling an operation of a machine subject to state constraints in continuous state space of the machine and subject to control input constraints in continuous control input space of the machine according to some embodiments of the invention. The system 600 may include a human machine interface (HMI) 610 connectable with a keyboard 611 and a pointing device/medium 612, a processor 620, a storage device 630, a memory 640, a network interface controller 650 (NIC) connectable with a data communication network 690 including local area networks and internet network, a control interface 670 to transmit a control input 675 to the machine. The control system 600 can receive data indicative of state of a machine 695 via the network 690 connected to the NIC 650. The storage device 630 includes a reinforcement learning (RL) algorithm (program) 631, a supervisor algorithm 633, a reward function, cost function, and maximum penalty parameters for the RL and supervisor algorithms 634, inequalities describing the constraints 632 on the system 600, and inequalities describing the zero-effort set 635. The pointing device/medium 612 may include modules that read programs stored on a computer readable recording medium.

Accordingly, some embodiments of the present invention can provide a computer-implemented method for controlling an operation of a machine subject to state constraints in continuous state space of the machine and subject to control input constraints in continuous control input space of the machine. In this case, the method may include steps of accepting data indicative of a state of the machine, computing a safety margin of a state and action pair satisfying the state constraints and a control policy mapping the state of the machine within a control invariant set (CIS) to a control input satisfying the control input constraints, wherein a control of the machine having the state within the CIS according to the control policy maintains the state of the machine within the CIS, and iteratively performing a reinforcement learning (RL) algorithm to jointly control the machine and update the control policy, wherein, for performing the joint control and update, wherein the iteratively performing step comprises controlling the machine using the control policy to collect data including a sequence of control inputs generated using the control policy and a sequence of states of the machine corresponding to the sequence of control inputs determining a reward for a quality of the control policy on the state of the machine using a reward function of the sequence of control inputs and the sequence of states of the machine augmented with an adaptation term determined as the minimum amount of effort needed for the machine having the state to remain within the CIS, and updating the control policy that improves a cost function of operation of the machine according to the determined reward. In some cases, the computer-implemented method can be used to control a suspension system (systems) of a vehicle.

Although a vehicle suspension system is described above as an example, the safe supervisor (safe supervisor control method) according to the present invention is not limited to the vehicle suspension, the safe supervisor can be applied to control actuators and suspensions used in a robotic system or a factory automation system.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component. Though, a processor may be implemented using circuitry in any suitable format.

Also, the embodiments of the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Although the invention has been described by way of examples of preferred embodiments, it is to be understood that various other adaptations and modifications can be made within the spirit and scope of the invention.

Therefore, it is the object of the appended claims to cover all such variations and modifications as come within the true spirit and scope of the invention.

We claim:

1. A system for controlling an operation of a machine subject to state constraints in continuous state space of the machine and subject to control input constraints in continuous control input space of the machine, comprising:
   an input interface to accept data indicative of a state of the machine;
   a memory configured to store an optimization problem for computing a safety margin of a state and action pair satisfying the state constraints and a control policy mapping the state of the machine within a control invariant set (CIS) to a control input satisfying the control input constraints, wherein a control of the machine having the state within the CIS according to the control policy maintains the state of the machine within the CIS, wherein the memory includes a supervisor algorithm that obtains the state of the machine and computes a desired safety margin, wherein the supervisor algorithm generates a safe command when a reinforcement learning (RL) algorithm generates a command that is deemed unsafe, wherein the safe command is a modification of the unsafe command according to optimization (SO):

$c(t) = \min \alpha \sum_{k=1}^{N} \|u(k|t)\|_1,$ where c(t) is a cost function, u(k|t) is a command vector predicted value of u(t+k), α is a scaling factor, k, N are integers, t is a current time of the system; and
   a processor configured to iteratively perform the RL algorithm to jointly control the machine and update the control policy, wherein, for performing the joint control and update, the processor is configured to
   control the machine using the control policy to collect data including a sequence of control inputs generated using the control policy and a sequence of states of the machine corresponding to the sequence of control inputs;
   determine a reward for a quality of the control policy on the state of the machine using a reward function of the sequence of control inputs and the sequence of states of the machine augmented with an adaptation term determined as the minimum amount of effort needed for the machine having the state to remain within the CIS; and
   update the control policy that improves a cost function of operation of the machine according to the determined reward.

2. The system of claim 1, wherein the RL algorithm is a deep-deterministic policy gradient (DDPG) algorithm.

3. The system of claim 2, wherein the DDPG algorithm learns both a critic network to estimate long-term values for a given policy and an actor network to sample optimal actions according to the estimated long-term values.

4. The system of claim 1, wherein the reward function is modified to an updated reward by subtracting the cost function from the reward function, wherein the updated reward is expressed by $\hat{r}(t) = r(t) - c(t),$ where $\hat{r}(t)$ is the updated reward, r(t) is the reward function, c(t) is the cost function, and t is a current time of the system.

5. The system of claim 1, wherein the scaling factor α is chosen such that the cost c(t) is between $+c_b$, wherein Cb are bounds on the cost function.

6. The system of claim 1, wherein a maximum penalty G for performing the RL algorithm is about twice a value of $c_b$: $G \approx 2c_b$, wherein $c_b$ are bounds on the cost function.

7. The system of claim 1, wherein the machine is a suspension system of a vehicle.

8. A computer-implemented method for controlling an operation of a machine subject to state constraints in continuous state space of the machine and subject to control input constraints in continuous control input space of the machine, wherein the computer-implemented method is stored in a memory, comprising steps of:
   accepting data indicative of a state of the machine;
   computing a safety margin of a state and action pair satisfying the state constraints and a control policy mapping the state of the machine within a control invariant set (CIS) to a control input satisfying the control input constraints, wherein a control of the machine having the state within the CIS according to the control policy maintains the state of the machine within the CIS, wherein the memory includes a supervisor algorithm that obtains the state of the machine and computes a desired safety margin, wherein the supervisor generates a safe command when a reinforcement learning (RL) algorithm generates a command that is deemed unsafe, wherein the safe command is a modification of the unsafe command according to optimization (SO):

$c(t) = \min \alpha \sum_{k=1}^{N} \|u(k|t)\|_1,$ where c(t) is a cost function, u(k|t) is a command vector predicted value of u(t+k), α is a scaling factor, k, N are integers, t is a current time of the system; and
   iteratively performing the RL algorithm to jointly control the machine and update the control policy, wherein, for performing the joint control and update, wherein the iteratively performing step comprises:

controlling the machine using the control policy to collect data including a sequence of control inputs generated using the control policy and a sequence of states of the machine corresponding to the sequence of control inputs;

determining a reward for a quality of the control policy on the state of the machine using a reward function of the sequence of control inputs and the sequence of states of the machine augmented with an adaptation term determined as the minimum amount of effort needed for the machine having the state to remain within the CIS; and updating the control policy that improves a cost function of operation of the machine according to the determined reward.

9. The method of claim 8, wherein the RL algorithm is a deep-deterministic policy gradient (DDPG) algorithm.

10. The method of claim 9, wherein the DDPG algorithm learns both a critic network to estimate long-term values for a given policy and an actor network to sample optimal actions according to the estimated long-term values.

11. The method of claim 8, wherein the reward function is modified to an updated reward by subtracting the cost function from the reward function, wherein the updated reward is expressed by $$\hat{r}(t)=r(t)-c(t),$$

where $\hat{r}(t)$ is the updated reward, $r(t)$ is the reward function, $c(t)$ is the cost function, and t is a current time of the system.

12. The method of claim 8, wherein the scaling factor $\alpha$ is chosen such that the cost $c(t)$ is between $+c_b$, wherein $c_b$ are bounds on the cost function.

13. The method of claim 8, wherein a maximum penalty G for performing the RL algorithm is about twice a value of $c_b$: $G \approx 2c_b$, wherein $c_b$ are bounds on the cost function.

14. The method of claim 8, wherein the machine is a suspension system of a vehicle.

* * * * *